United States Patent [19]
Oh

[11] Patent Number: 5,616,078
[45] Date of Patent: Apr. 1, 1997

[54] MOTION-CONTROLLED VIDEO ENTERTAINMENT SYSTEM

[75] Inventor: Ketsu Oh, Kobe, Japan

[73] Assignee: Konami Co., Ltd., Hyogo-ken, Japan

[21] Appl. No.: 364,897

[22] Filed: Dec. 27, 1994

[30] Foreign Application Priority Data

Dec. 28, 1993 [JP] Japan ..................................... 5-335659

[51] Int. Cl.⁶ ................................. A63F 9/22; G09G 5/00
[52] U.S. Cl. .................................. 463/8; 463/39; 345/156
[58] Field of Search ..................................... 273/433, 434, 273/435, 436, 437, 438, 148 B; 463/8, 39

[56] References Cited

U.S. PATENT DOCUMENTS 5,288,078  2/1994  Capper et al. ........................ 273/148 B

FOREIGN PATENT DOCUMENTS 63-125280  5/1988  Japan .
64-56289   4/1989  Japan .
2-179079   7/1990  Japan .

Primary Examiner—William H. Grieb
Attorney, Agent, or Firm—Jordan and Hamburg

[57] ABSTRACT

A motion-controlled video entertainment system includes markers to be attached at a specified position on a player; a detector operable to detect threo-dimensional positions of the markers; a calculator operable to calculate posture parameters of the player based on the detected three-dimensional positions of the markers; a game processor operable to generate a game image in accordance with a predetermined game program and the calculated posture parameters of the player; and a display device operable to display a generated game image. The motion of a particular game character displayed on the display device is controlled in accordance with the motion of the player's body, thereby enabling realization of a more real atmosphere.

17 Claims, 8 Drawing Sheets

MOTION-CONTROLLED VIDEO ENTERTAINMENT SYSTEM

BACKGROUND OF THE INVENTION

This invention relates to a motion-controlled video entertainment system in which game contents are displayed in the form of visual images in a display device such as a CRT (cathode ray tube) and a LCD (liquid crystal device) and progress of a game is controlled based on control information externally input by a player.

Fighting-type game devices which simulate fighting actions such as boxing and "karate" are known as a motion-controlled video entertainment systems. The fighting-type game devices are provided with a display device for displaying game contents in the form of visual images, an operable member for inputting in which direction and how strongly game characters should act, a loudspeaker for generating sound effects suitable for the development of the game. The player operates the operable member to advance play of the game displayed by the display device.

For example, in a boxing game, a main body of a game machine is provided with an operable member for inputting how the game character should punch and in which direction it should move for defense. On the display device, there is displayed a fight between a boxer A corresponding to the player and an opponent boxer B. The player is allowed to enjoy simulated boxing with the boxer B by controlling the motion of the boxer A displayed on the display device by use of the operable member.

The main body of the game machine is also provided with a pair of operable members with which two players are allowed to enjoy simulated boxing by controlling the motion of the boxers A and B displayed on the display device, respectively.

With the conventional fighting-type game systems, the motion of game characters displayed in the display device is controlled only by use of an operation lever such as joy stick and an operable member such as an operation button. Thus, these systems cannot sufficiently make players feel as if they were actually fighting, resulting in a poor sense of reality in the game process.

For example, in the case of the boxing game, if the player wants to make the boxer A displayed in the display device punch the opponent, he have to select which hand the boxer A should use to punch, which kind of punch (straight, hook, jab, etc.) the boxer A should give, and where the punch should land (face, body, etc.) and operate the operation lever or operation button accordingly. This operation is quite different from the real action the boxer would actually take to throw a punch.

Particularly, complicated motions of the game character are realized by using a plurality of operable members in combination (e.g., by using a joy stick and a key in combination). Accordingly, unless players have, in advance, a sufficient knowledge about how the operable members should be operated and combined, they are not able to effectively operate the game character. Thus, it is very difficult for them to casually enjoy the game.

Further, since the players control the motion of the game character only through finger or hand operation, they cannot experience a sense of fatigue that they would have after a real action of fighting.

Moreover, the motion of the game character in a display screen is controlled based on the limited information input by way of the operable member. Thus, it is difficult to smoothly manipulate the game character and sufficiently reproduce the actual motion of a fighter such as a boxer or a "karate" fighter.

SUMMARY OF THE INVENTION

Accordingly, it is an object of the present invention to provide a motion-controlled video entertainment system in which the problems residing in the prior art can be overcome.

It is another object of the present invention to provide a motion-controlled video entertainment system in which the motion of game characters displayed on a display device is controlled in accordance with the motion of a player's entire body, thereby greater realism in the fight-type game can be realized, bring to the player a more realistic sensation.

The present invention is directed to a motion-controlled video entertainment system comprising: a marker to be attached at a specified position of a player; a detector operable to detect a position of the marker; a calculator operable to calculate posture parameters of the player based on the detected position of the marker; a game processor operable to generate a game image in accordance with a predetermined game program and the calculated posture parameters of the player; and a display device operable to display a generated game image.

The game image includes a particular game character movable on the display device in accordance with a motion of the player. The game processor may be constructed by a memory operable to store a plurality of object images respectively representing different posture parameters of the particular game character; and a designator operable to designate an object image corresponding to the calculated posture parameters of the player. The game image may be further provided with another game character which is controlled by the game processor to act as the opponent of the character controlled by the single player.

A feature of the present invention includes a camera for photographing the player in different posture parameters; an object image producer for producing a plurality of object images respectively representing different posture parameters of the particular game character based on photographed images of the player in different posture parameters, and the game processor having a memory for storing the plurality of object images of the particular game character; and a designator for designating an object image corresponding to the calculated posture parameters of the player.

An embodiment of the detector includes a reference sheet over which the player acts; and a camera for photographing the player on the reference sheet, wherein a field of view of the camera is held in a fixed positional relation to the reference sheet to calculate posture parameters of the player based on a relative position between a photograph image of the reference sheet and a photograph of the mark.

The camera may execute the photography at a specified interval. The camera may be a camera with a CCD sensor.

Further, the present invention is directed to a motion-controlled video entertainment system comprising: a marker to be attached at a specified position of each of a plurality of players; a plurality of detectors for detecting positions of the markers of the plurality of players respectively; a calculator for calculating posture parameters of the plurality of players based on the detected positions of the marks respectively; a game processor for generating a plurality of game images for the plurality of players in accordance with a predetermined game program and the respective calculated posture parameters of the plurality of players; and a plurality of display devices for displaying generated game images respectively.

In the above embodiments of the present invention, a mark is attached at a specified position of the player and a motion of the player is detected by the detector. A game character acts on a screen of the display device in accordance with the motion of the player. Accordingly, the player can enjoy the game by manipulating the motion of the game character by moving his body while monitoring the game contents displayed in the form of visual images in the display device.

Also, the game character acts according to the motion of the player. Accordingly, the player can feel as if he were really fighting with his opponent if the invention is applied, for example, to fighting type games.

Further, the game character may be produced using images obtained by photographing the player himself. In this case, the image of the player is displayed as a particular game character on the display device, thereby improving visual presence and reality of the game.

Furthermore, the game processor generates a plurality of game images according to acts of a plurality of players respectively, so that the plurality of players can enjoy the game separately.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
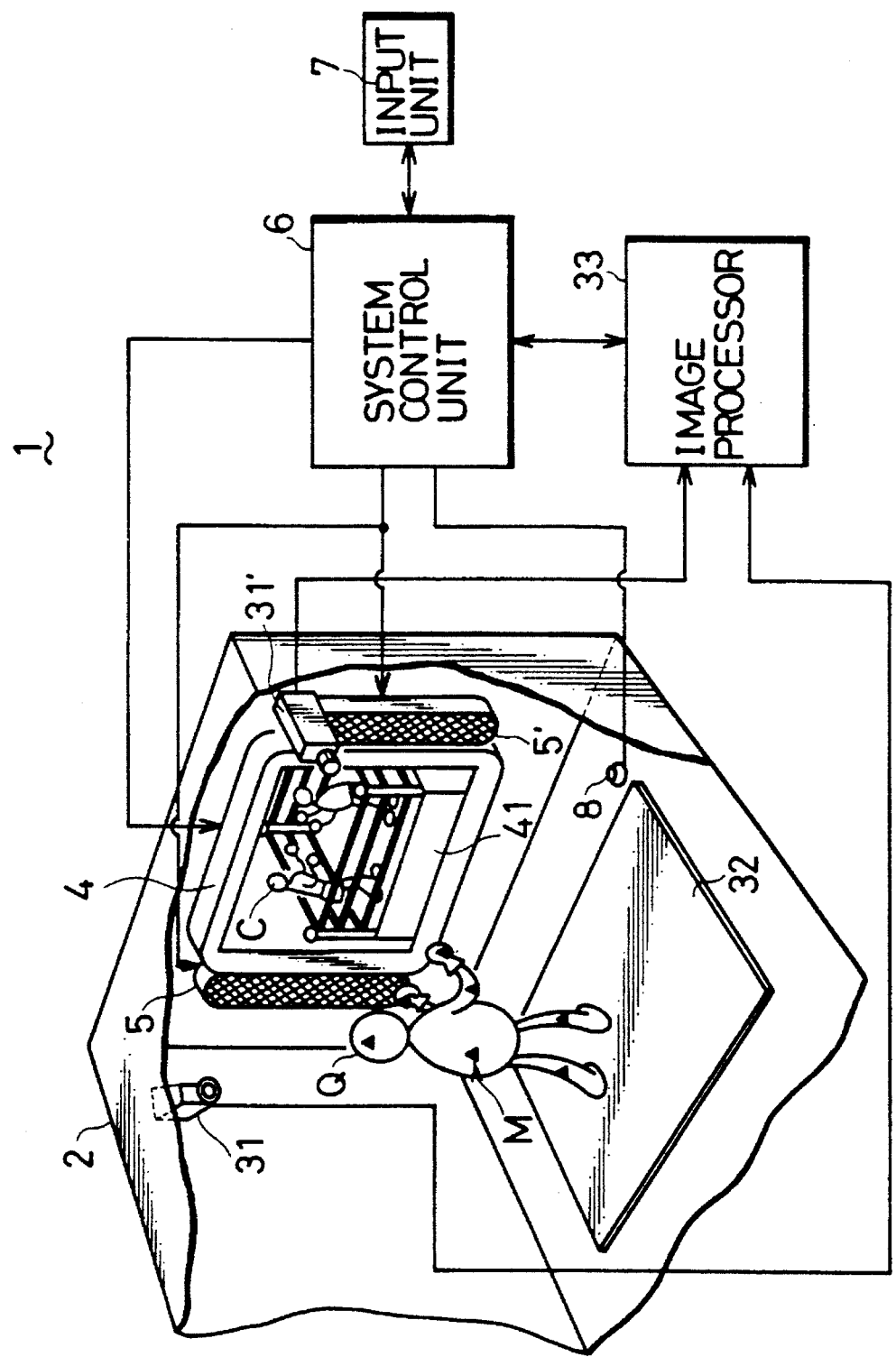
FIG. 1 is a schematic diagram showing an overall construction of a first motion-controlled video entertainment system according to the invention.
Figure 2:
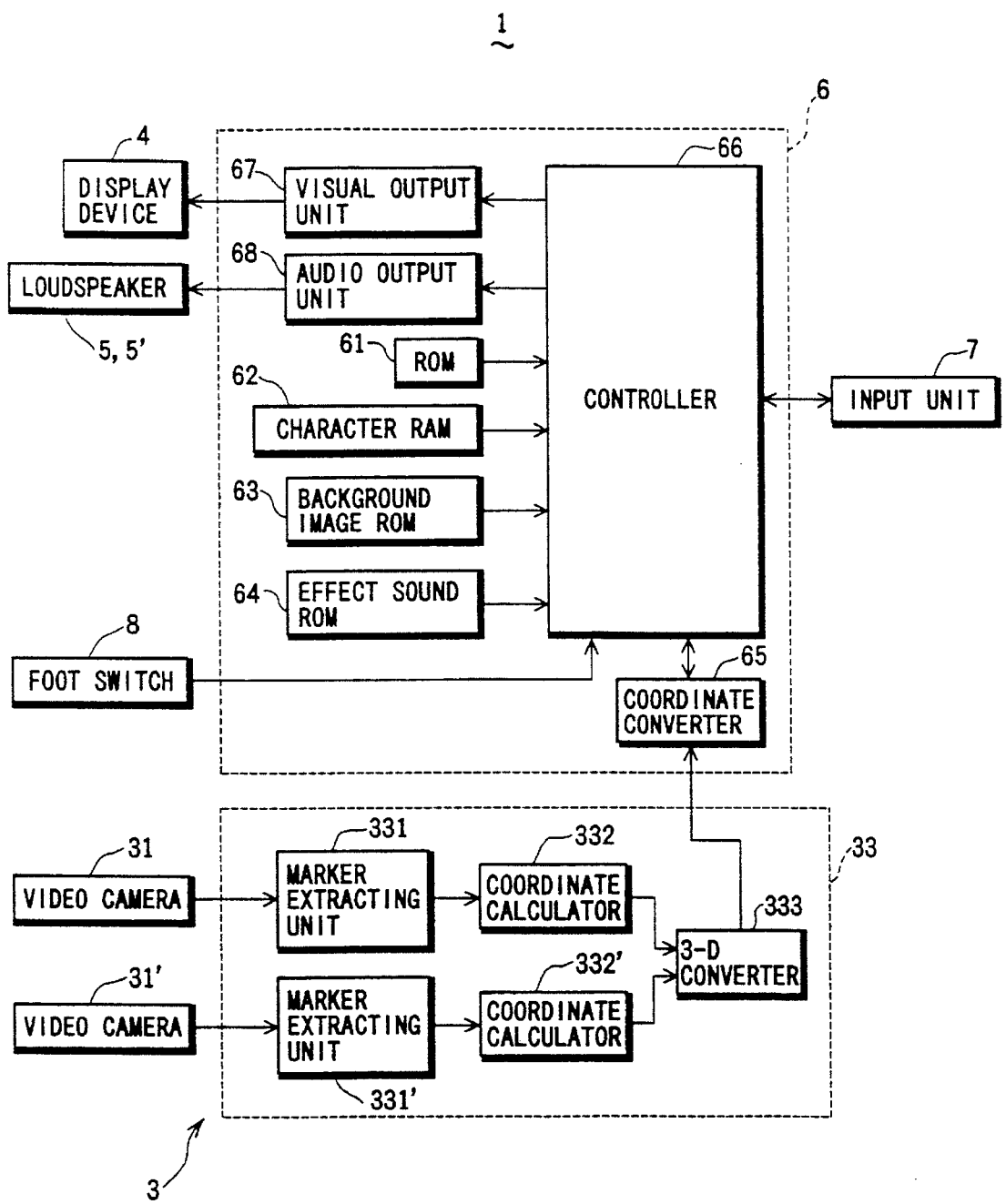
FIG. 2 is a block diagram showing a control portion of the first system.

FIG. 1 is a schematic construction diagram of a first embodiment of a motion-controlled video entertainment system according to the invention, and FIG. 2 is a block diagram of a control portion thereof.

Referring to FIGS. 1 and 2, a motion-controlled video entertainment system 1 is installed in a game compartment 2. The system 1 is provided with a motion capture unit or detector 3, a display device 4, loudspeakers 5 and 5', a system control unit 6 and an input device 7. The motion capture unit 3 detects a motion state of the player in real time. The display device 4 is a large screen CRT or LCD on which contents of the game are displayed in the form of visual images. The loudspeakers 5 and 5' generate effect sounds suitable for the process of the game. The control unit 6 controls the progress and development of the game, the image display in the display device 4, and the generation of the effect sounds by the loudspeakers 5 and 5'. The input device 7 is used to accept coins as a play fee and set play conditions, etc.

The display device 4 is disposed on the front wall of the game compartment 2 and the loudspeakers 5 and 5' are disposed at opposite sides of the display device 4.

The motion capture unit 3 includes a pair of video cameras 31 and 31', a reference sheet 32 and an image processor 33. The video cameras 31 and 31' pick up images of a player Q to whom sets of markers M are attached at a plurality of positions. The reference sheet 32 defines reference coordinate systems for specifying the positions of the sets of markers M. The image processor 33 extracts the sets of markers M from the image picked up by the video cameras 31 and 31' and detects the coordinates that indicate the positions of the respective sets of markers M.

The reference sheet 32 is laid on the floor at a suitable position before a display screen 41 of the display device 4. The player Q plays a game by moving his body on the reference sheet 32 while watching the game images displayed on the display screen 41.

A foot switch 8, for designating the start and stop of the game, is disposed at a specified position near the reference sheet 32. In place of the foot switch 8, a remote controller employing infrared rays may be used to designate the start and stop of the game. Alternatively, the player Q may make a specified motion to generate a signal designating the start or stop of the game based on an image associated with the motion.

The video cameras 31 and 31' are disposed at positions suitable to overlook the player Q obliquely from front and above. For example, they are disposed at upper positions of the opposite sides of the front wall, at upper positions of the corner portions defined between the front wall and the opposite side walls, or at upper positions of the opposite side walls in the vicinity of the corner portions.

The sets of markers M are adapted to indicate body parts or joints of the player Q such as a head, hands, arms, legs and elbows, and each include a light omitting or reflecting member such as a color pad, a light-reflecting gum pad, a visible radiation LED (light emitting diode) and infrared ray LED. The sets of markers M may directly be attached to the body of the player Q, or the player Q may put on a special clothes to which light emitting or reflecting members are attached at a plurality of positions in advance.

The video cameras 31 and 31' each include an image sensor such as CCDs (charge coupled devices) and pick up object images in accordance with the standard or specially-specified signal system. In the case where the sets of markers M emit light by means of the visible radiation LED, the video cameras 31 and 31' are a color video camera provided with an image sensor device such as CCDs. In the case where the sets of markers M emit light by means of the infrared ray LED, an IR filter which cuts visible rays is provided on the surface of the optical lens of each camera so that the sets of markers M can be detected from the background of the camera image.

The range of view of the video cameras 31 and 31' is adjusted according to the size of the reference sheet 32 to be photographed and the positions of the video cameras 31 and 31'. This adjustment is made by replacing the mechanically-mounted lens of the video cameras 31 and 31' with one having a selected one of suitable optical parameters such as focus range, etc.

The image processor 33 includes a marker extracting unit 331, 2 coordinate calculator 332, and a hardware calculation unit 333 for three-dimensional coordinate transformation. The marker extracting unit 331 extracts images of the sets of markers M from the image picked up by the video cameras 31 and 31' in a fixed sampling rate, e.g.. 60 Hz or higher. The calculator 332 calculates the coordinates of the center of weight of the markers M from the extracted data of image at every time of sample. The unit 333 converts the two-dimensional coordinates of the sets of markers M into three-dimensional coordinates. The image processor 33 outputs to the game processor the coordinates of the respective sets of markers M at the time rate of the same as the video signal as motion information of the player Q.

Figure 3:
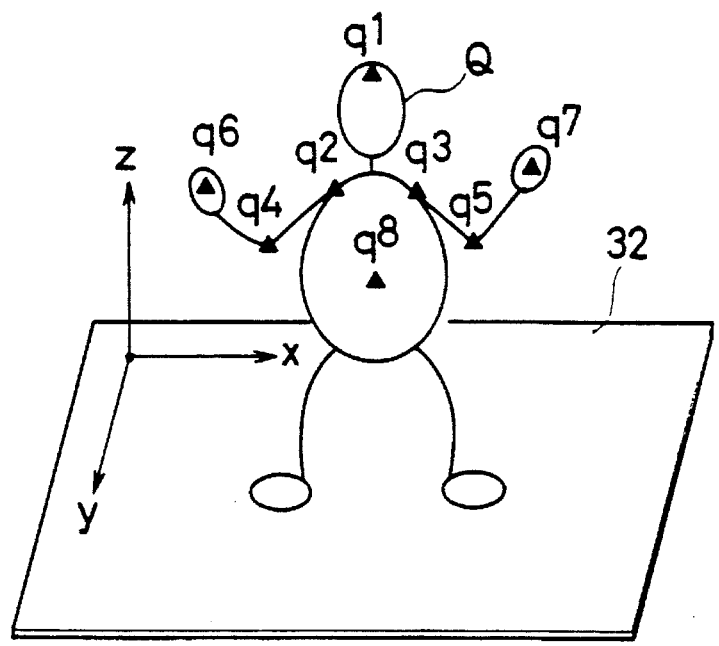
FIG. 3 is a diagram showing an example of positions of sets of markers attached to a player's body.

For example, in the case of a boxing game, eight sets of markers M are attached to the head q1, both shoulders q2 and q3, both elbows q4 and q5, both hands q6 and q7, belly q8 of the player Q as shown in FIG. 3, the coordinates pi (i=1 to 8) of the sets of markers M attached at the respective body parts are calculated in the specified cycle on the basis of the images picked up by the video camera 31. Similarly, the coordinates pi' (i=1 to 8 ) of the respective body parts q1 to q8 are calculated on the basis of the images picked up by the video camera 31'. The coordinates Pi (i=1 to 8) of the respective body parts q1 to q8 in the three-dimensional space are calculated based on these coordinates pi and pi'. The number of the index i corresponds to the number of the respective body parts.

At each sampling time t, the coordinates Pi are calculated as coordinates in x-y-z-coordinate systems (see FIG. 3) having the surface of the reference sheet 32 as an x-y plane. The information of the coordinates Pi (x, y, z, t) is sequentially input to the system control unit 6.

The system control unit 6 includes a ROM 61 for storing a game program, a character RAM (random access memory) 62 for storing a variety of posture parameters of a game character, a background image ROM 63 for storing background images of the game, an effect sound ROM 64 for storing effect sounds and dramatic sounds, a coordinate converter 65, a controller 65, a visual output unit 67 and an audio output unit 68. The converter 65 converts the coordinate information Pi (x, y, z, t) (i=1 to 8) of the respective body parts q1 to q8 of the player Q which are input from the image processor 33 into a coordinate information Ti (u, v, w, t) (i=1 to 8) of the game character on the display screen 41 of the display device 4 and calculates an origin position XO(t) of the game character and a displayed posture parameters Xj(t) (j=1 to 7) from the coordinate information Ti(u, v, w, t). The controller 66 generates an image of the game character (hereinafter referred to as an object image) to be displayed in the display device 4 and administers the progress and development of the game. The video output unit 67 generates an image representing a game content by combining the object image and the background image and outputs the generated image to the display device 4. The audio output unit 68 outputs the effect sounds to the loudspeakers 5 and 5'.

As shown in FIG, 4, the coordinates Ti(u, v, w, t) are coordinates in u-v-w coordinate systems, at sampling time t, for defining a motion range of a game character C which is virtually formed on the display screen 41. The virtual u-v-w coordinate systems are determined by the game content and thus change according to the progress of the game scene. The coordinates Ti (u, v, w, t) are calculated by converting the coordinates Pi (x, y, z, t) in the x-y-z coordinate system into those in the u-v-w coordinate system.

Figure 4:
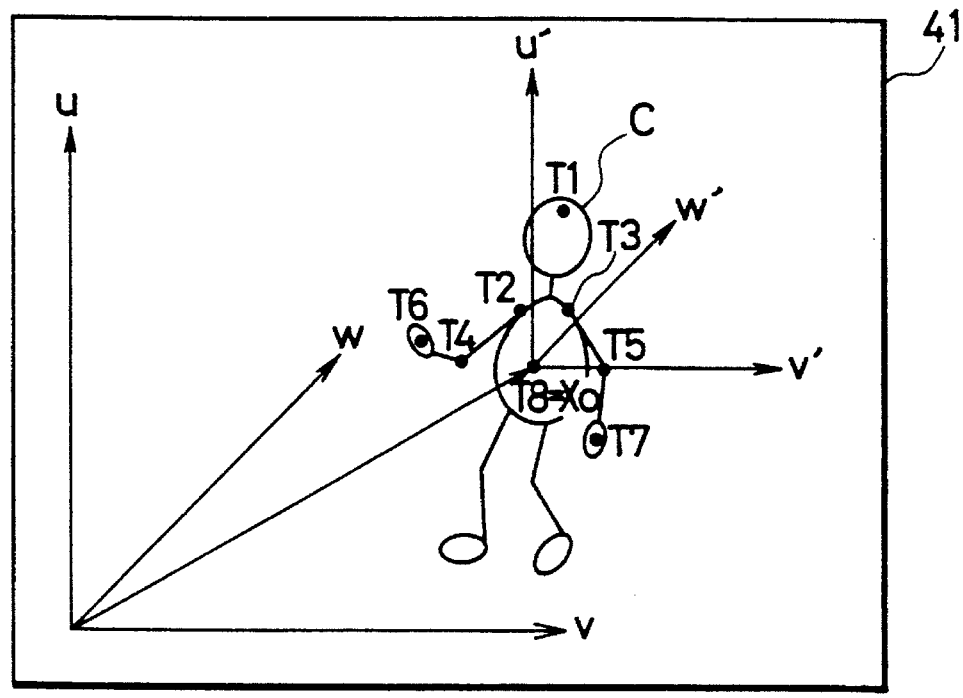
FIG. 4 is a diagram showing coordinate systems of a game character on a display screen of a display device.

The origin position XO(t) represents not only an origin of a center of gravity coordinate system (u'-v'-w' coordinate systems in FIG. 4) of the game character C sampling time t, but also coordinates that locate the position of the game character C. Accordingly, arbitrary coordinates Ti (u, v, w, t) are set as the origin position XO(t) and the display position of the game character C on the display screen 41 of the display device 4 is determined by determining the origin position XO(t) on the screen 41.

The center of gravity coordinate systems are adapted to define a display posture parameters xj(t) of the game character C. For example, when the sets of markers M are arranged as shown in FIG. 3, the posture parameters of the game character C on the display screen 41 is specified by eight body parts q1 to q8 and determined by the relative positional relationship of these body parts q1 to q8.

Thus, one of the body parts q1 to q8 (q8 in FIG. 3) serves as the origin position XO(t) of the center of gravity coordinate systems. The display posture parameters Xj(t) of the game character C is represented by coordinates in these coordinate systems (coordinates relative to the origin position XO(t)) which locate the other body parts. For example, the belly q8 is set as an origin of the center of gravity coordinate systems. The origin position XO(t) of the game character C is represented by T8 (u, v, w, t) and the display posture parameters Xj(t) (j=1 to 7) is represented by Xj (u, v, w, t)=Tj (u, v, w, t)–T8 (u, v, w, t), (j=1 to 7).

In the character RAM 62, there are stored as a data base images of the game character C in a plurality of posture parameters which can be determined by the display posture parameters Xj(t) (j=1 to 7). The image of the game character C in a specified posture parameters is displayed on the display screen 41 by reading the image of the game character C in posture parameters corresponding to the display posture parameters Xj(t) (j=1 to 7) from the character RAM 62.

It should be appreciated that the image of the game character C can be displayed in the form of three-dimensional CG (Computer Graphics) model, such as a polygon model, by calculating the CG model parameters based on the origin position XO(t) and the display posture parameters Xj(t) (j=1 to 7).

The input device 7 is provided with an insertion slot for inserting a coin or a card unit for accepting prepaid cards for game payment and an operation button for inputting game conditions. For example, in the case of a boxing game, the game conditions include selection of game characters representing the player and his opponent, selection of a match level such as a title match, selection of a title defending or challenging match, boxing class (middle class, heavy class, etc.) and other conditions.

In the above construction, when the game fee is paid in the input device 7, the controller 66 loads the game parameters from the input device 7 with the result the game system is enabled to start the game. The game is started when the player input the game conditions and operates the foot switch 8 to designate the start of the game.

The controller 66 generates a specified object image on the basis of the coordinates Pi (x, y, z, t) of the respective body parts of the player Q input from the image processor 33 in accordance with the game program: reads a specified background image from the background image ROM 83 and outputs the same to the visual output unit 67: and reads specified effect sounds or dynamic sounds from the effect sound ROM 64 to generate a BGM (background music) for the progress of the game.

The object image and background image are combined in the visual output unit 67 and a combined image is displayed on the display screen 41 of the display device 4. The generated BGM is output to the loudspeakers 5 and 5' by way of the audio output unit 68 and is made audible by them.

Figure 5:
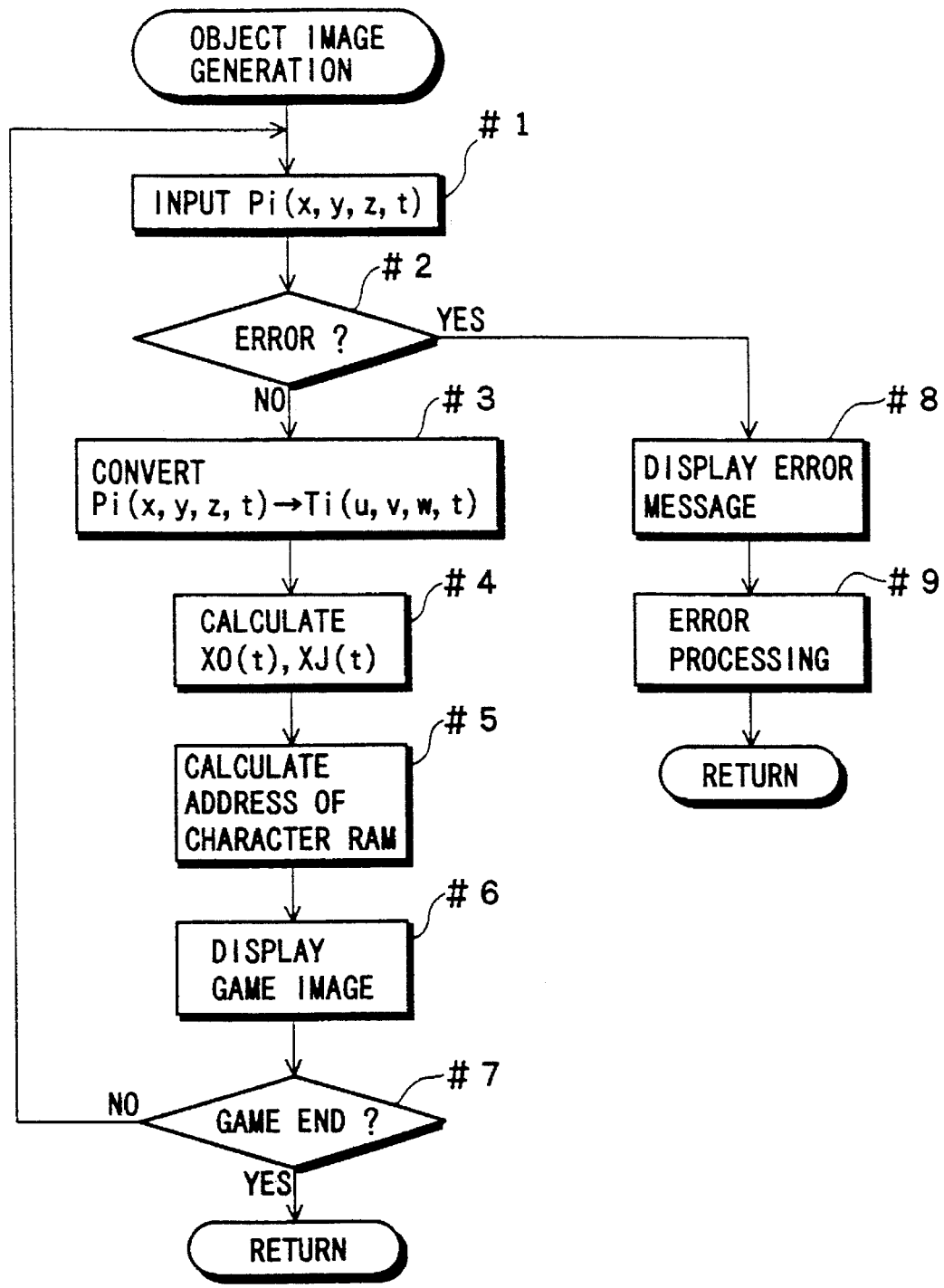
FIG. 5 is a flowchart showing an operation of generating an object image.

FIG. 5 is a flowchart showing an operation of generating an object image in accordance with the coordinate information Pi(x,y,z,t) of the respective body parts of the player Q.

When the coordinates Pi (x,y,z,t) of the respective body parts of the player Q are input from the image processor 33 (Step #1), an error check is conducted for these coordinates Pi (x,y,z,t) (Step #2). If there is an error (YES in Step #2), a specified error message is displayed in the display device 4 or a specified warning is made through the loudspeakers 5 and 5' (Step #8). Thereafter, a predetermined error processing is carried out.

If there is no error (NO in Step #2), the coordinates Pi (x,y,z,t) are converted into the coordinates Ti (u,v,w,t) of the game character by the coordinate converter 65 (Step #3) and the origin position XO(t) and the display posture parameters Xj(t)(j=1 to 7) of the game character C are calculated from the coordinates Ti (u,v,w,t) (Step #4).

Although the coordinates T8 (u,v,w,t) of the belly q8 serves as the origin position XO(t) in this embodiment, any arbitrary coordinates Ti (u,v,w,t) can serve as the origin position XO(t) on the basis of the game contents.

Subsequently, there is calculated an address of the character RAM 62 in which the object image in posture parameters corresponding to the calculated display posture parameters Xj(t) of the game character C are stored (Step #5). The corresponding object image is read from the character RAM 62: a game image to be displayed is generated by combining the object image with the background image at a position corresponding to the origin position XO(t) on the display screen 41: and the game image is displayed in the display device 4 (Step #6).

Hereafter, until the game ends, a new object image is generated in each sampling cycle in the same manner and renewably displayed in the display device 4 with combined with the background image (a loop of Steps #1 to #7). In this way, a game character which acts according to the motion of the player Q is displayed in the display device 4 during the game.

The game development, the game end, the composition on the screen during the game are prewritten in the game program. The game is controlled in accordance with this program. For example, the development of the boxing game may be such that: predetermined credit points are given to the player at the start of the game: the player loses 1 point each time his character is hit by the opponent five times: and the game is over when the credit points becomes "0".

The composition on the screen is devised so as to enhance the presence of the fight. For example, the composition may be such that the fight is two-dimensionally or three-dimensionally depicted from the ringside, or may be such that a view of the boxer corresponding to the player is three-dimensionally depicted.

As described above, the game character displayed in the display device acts according to the active state of the player.

Thus, the player can enjoy the game by moving his hands, legs and other body parts as if he were actually fighting while monitoring the game contents displayed on the display screen 41.

Further, since the player plays the game while moving his entire body, he can experience a comfortable fatigue, after the game, as he would do after exercises and thus experiences refreshing feeling.

The posture parameters of the game character displayed in the display device 4 is controlled in accordance with the continuous motion of the respective body parts of the player. Thus, the game character in complicated posture parameters can be represented more smoothly and authentically than that in the conventional game systems in which the posture parameters of the game character are controlled by the input in the way of the operation lever or operation button.

Although the first embodiment is described with respect to the motion-controlled video entertainment system designed for a single-player game, the motion-controlled video entertainment system alternatively may be constructed such that two or more players can play the game simultaneously.

Figure 6:
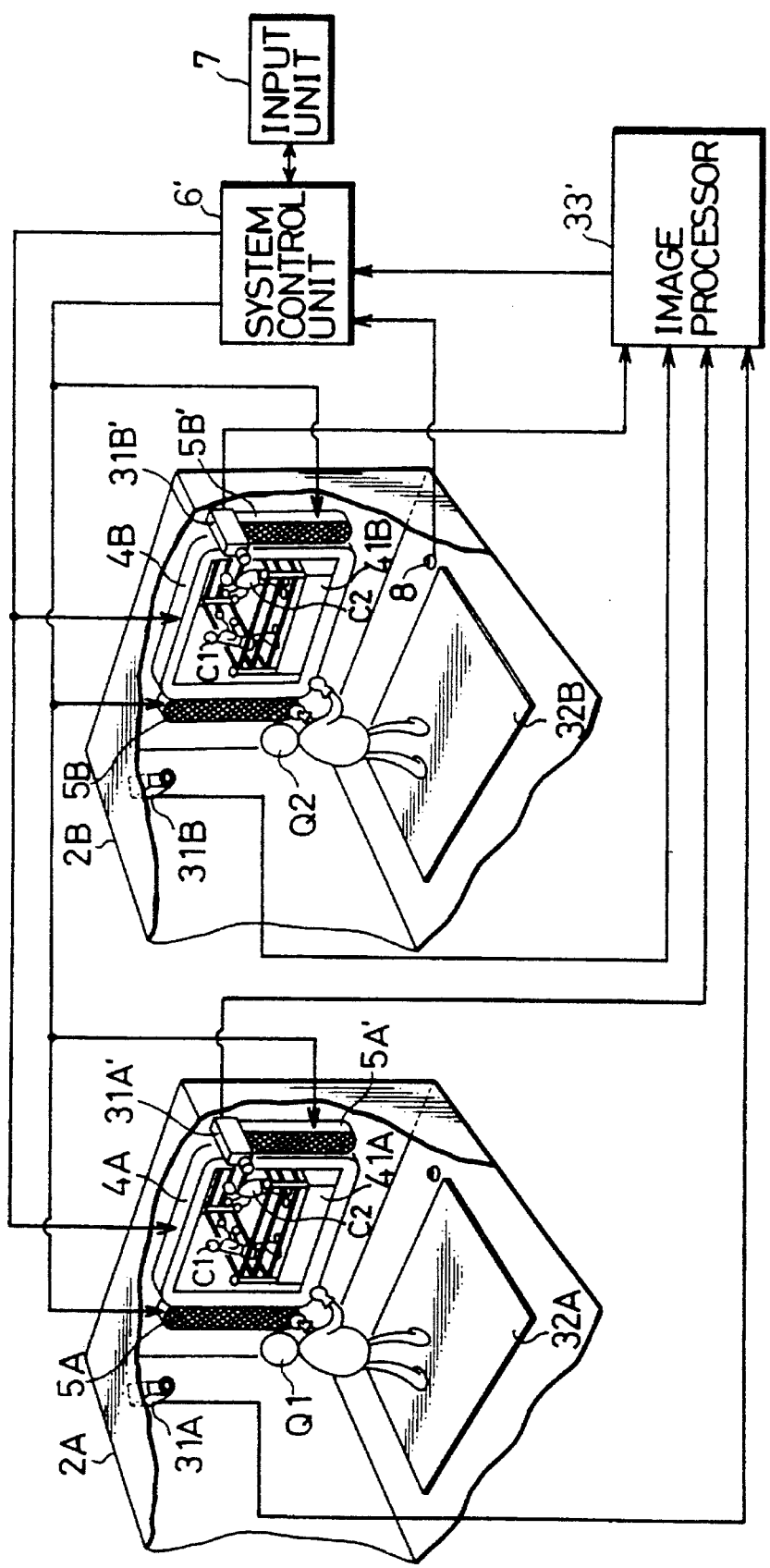
FIG. 6 is schematic diagram showing an overall construction of a second motion-controlled video entertainment system according to the invention.
Figure 7:
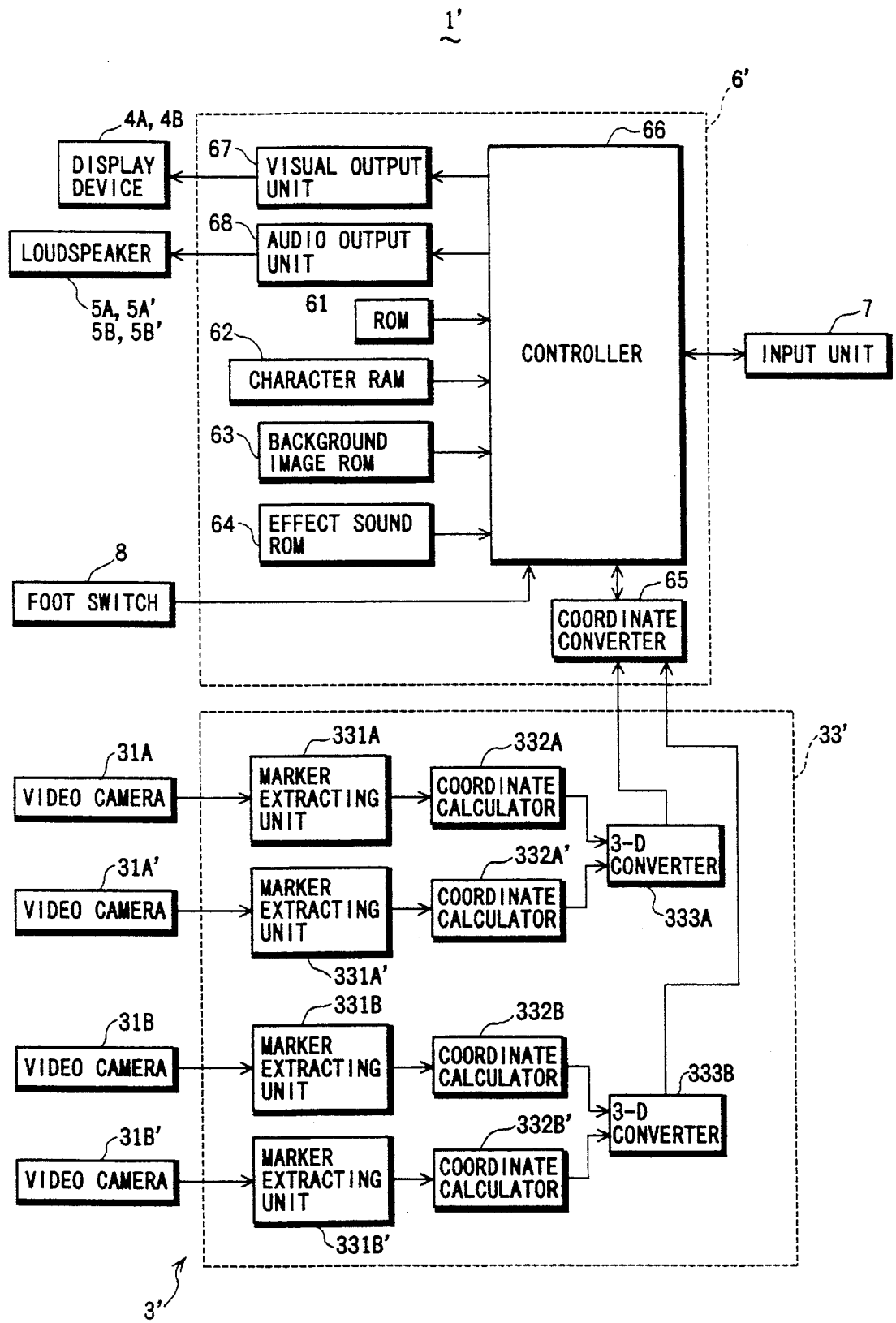
FIG. 7 is a blosk diagram showing a control portion of the second system.

FIG. 6 is a schematic construction diagram showing a second motion-controlled video entertainment system according to the invention, which is designed for two-player games. FIG. 7 is a block diagram showing a control portion of this motion-controlled video entertainment system.

The second embodiment shown in FIG. 6 differs from the first embodiment shown in FIG. 1 in that: there are provided two game compartments 2A and 2B having the same construction as the game compartment 2, an image processing unit 33' including two image processor having the same construction as the image processor 33, and a system control unit 6' having a more expanded control function than the system control unit 6.

The system control unit 6' is capable of controlling the motion of game characters C1 and C2 corresponding to players Q1 and Q2 on display screens 41A and 41B of display devices 4A and 4B and controlling the display on the display devices 4A and 4B, respectively.

This motion-controlled video entertainment system 1' allows not only a single player to play a game as described above, but also two players to play a game at the same time.

For example, in the case of a boxing game, the players Q1 and Q2 correspond to the game characters (boxers) C1 and C2, respectively. The boxers C1 and C2 displayed on the display screens 41A and 41B of the display devices 4A and 4B act according to the motion of the players Q1 and Q2. respectively. Therefore, the players Q1 and Q2 can enjoy the game as if they were actually fighting each other while viewing the fight of the boxers C1 and C2 displayed in the display devices 4A and 4B.

Figure 8:
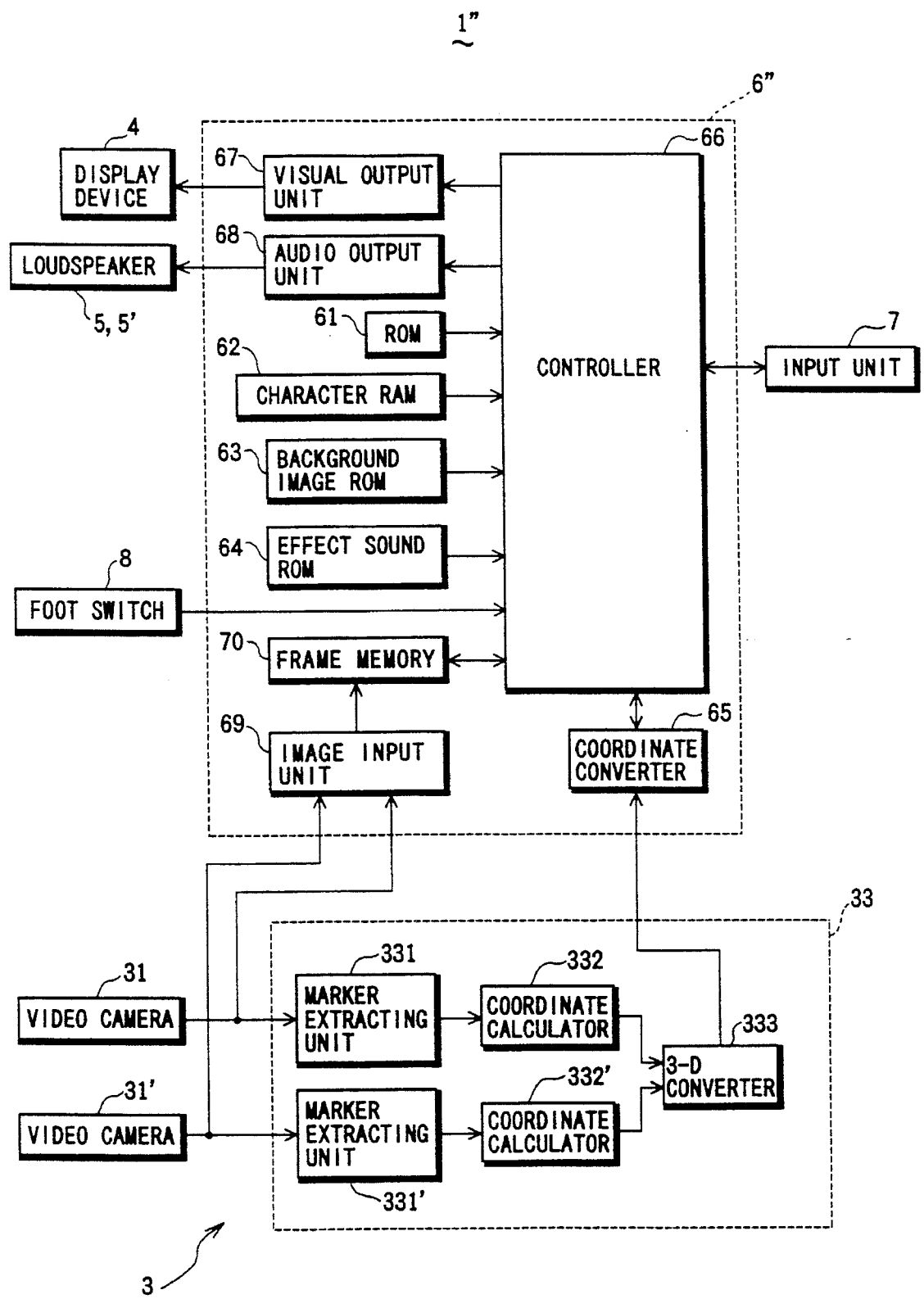
FIG. 8 is a block diagram showing a control portion of a third motion-controlled video entertainment system according to the invention.

FIG. 8 is a diagram showing a control portion of a third embodiment of the motion-controlled video entertainment system according to the invention.

In the third embodiment, a picked-up image of the player is used as a game character image. The display of the image of the player's own features on the display device allows the player to feel increased identity to the game character, thereby increasing the presence of the game.

The third embodiment shown in FIG. 8 differs from the first embodiment shown in FIG. 1 in that the system control unit 6 is further provided with an image input device 69 for inputting images of the player Q picked up by the video cameras 31 and 31' and a frame memory 70 for storing the input images. Images of the player Q in various posture parameters are read as a data base of the object images of the game character in various posture parameters.

With this motion-controlled video entertainment system 1", the object images are generated using the images obtained by picking up the images of the player Q before the start of the game. After the start, the game progresses while displaying the object images of the game character (actually taped character) generated by the picked-up images of the player Q as a game character corresponding to the player Q on the display screen 41 of the display device 4. It should be appreciated that the player Q can designate a preset game character without generating the object images of the actually taped character.

Figure 9:
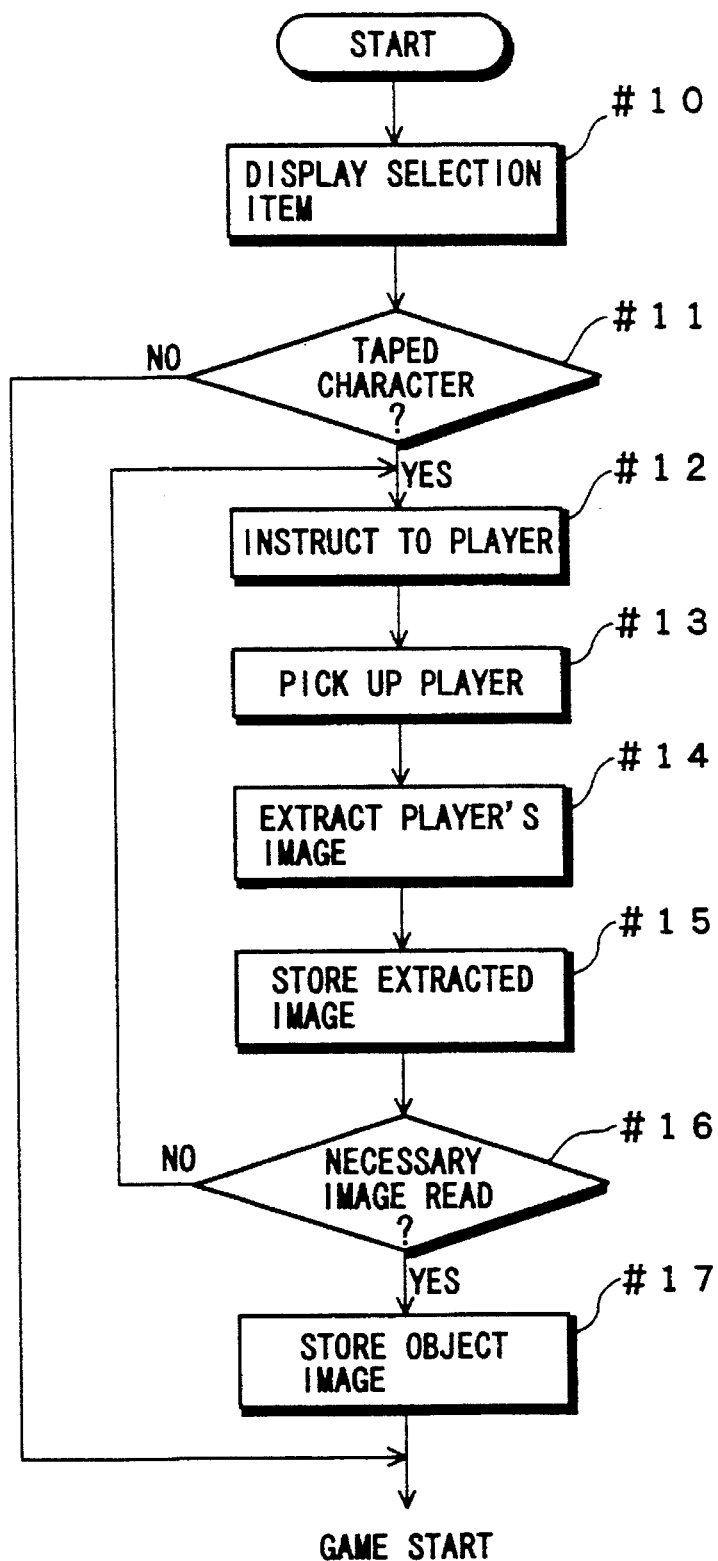
FIG. 9 is a flowchart showing an operation of generating a character image from an actually picked up image.

No detailed description is given here since the object images are successively displayed in the display device 4 in the same manner as described above. An operation of generating the object images of the actually taped character is briefly described with reference to a flowchart shown in FIG. 9.

When the game is enabled, a selection as to whether or not the actually taped character is to be generated and displayed on the display screen 41 of the display device 4 (Step #10). If the player Q selects the generation of the actually taped character (YES in Step #11), the taping position and posture parameters are audibly or visually instructed to the player Q (Step #12).

Subsequently, the player Q posing specified posture parameters according to the instruction is picked up and the picked up or taped images are stored in the frame memory 70 by way of the image input device 69 (Stop #13). The images of the player Q are extracted from the images stored in the frame memory 70 (Step #14). The extracted images are stored in the character RAM built in the system control unit 6 (Step #15).

It is discriminated whether necessary kinds and number of images of the player Q for generating the images of the actually taped character have been read (Step #16). If the image reading has not yet been completed (NO in Step #16), it is followed by Step #12 to further read the images of the player Q. Upon completion of the image reading (YES in Step #16), a plurality of object images of the actually taped character are generated from a plurality of the read images of the player Q and the object images are stored as a data base in the character RAM (Step #17). Thereafter, the game is started.

If the generation of the actually taped character is not selected (NO in Step #11), the game is started without generating the actually taped character.

Although the foregoing embodiments are described taking a boxing game as an example, the invention is widely applicable to fighting type games such as "judo", "karate" and "kendo" and match type sport games such as tennis, table tennis and badminton.

The invention is also applicable to simulation games such as golf and baseball. Its application to the golf game realizes not only pleasure as a game, but also a practical use as a golf practicing machine.

As described above, according to the invention, the active states of the respective body parts of the player are detected and the corresponding body parts of the game character displayed in the display device are controlled in accordance with the detected information. Accordingly, the player is enabled to control the motion of the game character only by moving his body while monitoring the display contents of the display device. Thus, the game operation can be simplified.

Since the game character acts according to the motion of the player, the player can feel as if he were really fighting with his opponent if the invention is applied, for example, to fighting type games. After the end of the game, the player can experience a refreshing feeling resulting from comfortable fatigue which he would experience after the exercise.

Since the motion of the game character displayed in the display device is controlled in accordance with the continuous motion of the player, it can be represented more smoothly and authentically.

Further, the game character may be generated using images obtained by taping the player. In this case, the image of the player is displayed as a game character in this display device, thereby improving visual presence and reality of the game.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A motion-controlled video entertainment system controlled by body motions of a player, the entertainment system comprising:

markers to be attached to the player at predetermined locations on the player;

a detector means for detecting three dimensional positions of respective ones of said markers in a three dimensional coordinate system;

a calculator means for calculating posture parameters of the player based on the detected positions of the markers;

a game processor means for generating a game image in accordance with a predetermined game program and the calculated posture parameters of the player; and a display means for displaying a generated game image generated by said game processor means.

2. A motion-controlled video entertainment system as defined in claim 1, wherein the game image includes a particular game character movable on the display means in accordance with a motion of the player.

3. A motion-controlled video entertainment system as defined in claim 2, wherein the game processor means includes:

a memory for storing a plurality of object images respectively representing different posture parameters of the particular game character; and a designator means for determining a select one of said plurality of object images which corresponds to the calculated posture parameters of the player.

4. A motion-controlled video entertainment system as defined in claim 3, wherein the game image further includes a game character which is controlled by the game processor means to act as an opponent of the particular game character.

5. motion-controlled video entertainment system as defined in claim 2, further comprising:

a camera operable to photograph the player in different posture parameters;

an object image producer operable to produce a plurality of object images respectively representing different posture parameters of the particular game character based on photographed images of the player in different posture parameters;

the game processor including a memory operable to store the plurality of object images of the particular game character and a designator means for determining a select one of said object images which corresponds to the calculated posture parameters of the player.

6. A motion-controlled video entertainment system as defined in claim 1, wherein the detector means includes:

a reference sheet over which the player performs; and a camera for photographing the player on the reference sheet, said camera having a field of view held in a fixed positional relationship to the reference sheet; and the calculator means includes means for calculating posture parameters of the player based on a relative positioning of said markers on said player in a first photograph image to the reference sheet in a second photograph image, said first and second photograph images being captured by said camera.

7. A motion-controlled video entertainment system as defined in claim 6, wherein the camera executes the photography at specified intervals.

8. A motion-controlled video entertainment system as defined in claim 6, wherein the camera is a CCD camera.

9. A motion-controlled video entertainment system controlled by body motions of a plurality of player, the entertainment system comprising:

markers to be attached at predetermined locations on each of said plurality of players;

a plurality of detector means for detecting three dimensional positions of the markers of the plurality of players respectively in a three-dimensional coordinate system;

a calculator means for calculating posture parameters of each of the plurality of players based on the detected positions of the markers on each of said plurality of players respectively;

a game processor means for generating a plurality of game images corresponding to the plurality of players in accordance with a predetermined game program and the respective calculated posture parameters of the plurality of players; and a plurality of display means for displaying generated game images, produced by said game processor means.

10. A motion-controlled video entertainment system as defined in claim 1, wherein the game image includes a particular game character changing posture on the display means in accordance with the calculated posture parameters of the player.

11. A motion-controlled video entertainment system as defined in claim 1, wherein the game image includes a particular game character changing posture on the display means in accordance with a motion of the player in any arbitrary chosen direction in the three dimensional coordinate system.

12. A motion-controlled video entertainment system comprising:

a plurality of markers to be attached at specified different positions of a player;

a detector means for detecting positions of the plurality of markers;

a calculator means for calculating relative positions of the markers relative to each other based on the detected positions of the markers in a three dimensional coordinate system;

a game processor means for generating a game image including a game character changing posture in accordance with a predetermined game program and the calculated relative positions of the markers on the player; and a display means for displaying a generated game image.

13. A motion-controlled video entertainment system as defined in claim 12, wherein:

the detector means includes:

a reference sheet over which the player performs; and a camera for photographing the player on the reference sheet, said camera having a field of view held in a fixed positional relationship to the reference sheet; and the calculator means includes means for calculating posture parameters of the player based on a relative positioning of said markers on said player in a first photograph image to the reference sheet in a second photograph image, said first and second photograph images being captured by said camera.

14. A motion-controlled video entertainment system as defined in claim 13, wherein:

the detector means further includes a second camera for photographing the player on the reference sheet, said camera having a field of view held in a fixed positional relationship to the reference sheet, the field of view of said second camera being different from that of said first camera; and the calculator means includes means for calculating posture parameters of the player based on:

said first relative positioning of said markers on said player in said first photograph image to the reference sheet in said second photograph image; and a second relative positioning of said markers on said player in a third photograph image to the reference sheet in a fourth photograph image, said third and fourth photograph images being captured by said second camera;

wherein said first and second relative positionings of said markers resulting from said first and second fields of view are used to determine positions of said markers in said three dimensional coordinate system.

15. A motion-controlled video entertainment system as defined in claim 12, further comprising:

the game image including a particular game character movable on the display means in accordance with a motion of the player;

a camera operable to photograph the player in different postures to obtain different posture parameters;

an object image producer operable to produce a plurality of object images respectively representing different posture parameters of the particular game character based on photographed images of the player in different posture parameters to generate an image of the particular game character having an appearance of the player;

the game processor including a memory operable to store the plurality of object images of the particular game character and a designator means for determining a select one of said object images which corresponds to the calculated posture parameters of the player.

16. A video system for generating images controlled by body motion of a player, the video system comprising:

markers affixed to the player at predetermined positions indicative of a posture of the player;

a reference sheet upon which the player executes body motions, said reference sheet defining a three dimensional coordinate system;

a first detector means for detecting first superimposed positions of said markers on said reference sheet from a first viewpoint;

a second detector means for detecting second superimposed positions of said markers on said reference sheet from a second viewpoint differing from said first viewpoint;

calculating means for calculating positions of each of said markers in said three dimensional coordinate system based on said first and second superimposed positions;

posture parameter generating means for generating posture parameters based upon said positions of said markers relative to each other; and image generating means for generating a game character image having a posture defined by said posture parameters to mimic a posture of said player.

17. The video system according to claim 16 wherein said calculating means includes means for transforming coordinates of said positions of said markers in said three dimensional coordinate system defined by said reference sheet to relative coordinates relative to a center marker included among said markers, said center marker defining an origin of a center of gravity based coordinate system wherein the origin represents a center of gravity of said game character image.

* * * * *